United States Patent
Inoda

(10) Patent No.: US 10,606,068 B2
(45) Date of Patent: Mar. 31, 2020

(54) OPTICAL SCANNING DEVICE

(71) Applicant: FUNAI ELECTRIC CO., LTD., Osaka (JP)

(72) Inventor: Takeshi Inoda, Nara (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 66 days.

(21) Appl. No.: 15/990,832

(22) Filed: May 29, 2018

(65) Prior Publication Data
US 2018/0348508 A1 Dec. 6, 2018

(30) Foreign Application Priority Data
May 30, 2017 (JP) ................................. 2017-107220

(51) Int. Cl.
G02B 26/08 (2006.01)
G02B 26/10 (2006.01)
G02B 7/182 (2006.01)

(52) U.S. Cl.
CPC ......... *G02B 26/105* (2013.01); *G02B 7/1821* (2013.01)

(58) Field of Classification Search
CPC ................ G02B 26/105; G02B 7/1821; G02B 27/0031; G01S 7/4811
USPC ..................................................... 359/199.1
See application file for complete search history.

(56) References Cited

U.S. PATENT DOCUMENTS

| 5,808,727 A | 9/1998 | Katayama |
| 7,940,443 B2 * | 5/2011 | Maeno ................. G01S 7/4817 359/212.1 |
| 2009/0051997 A1 | 2/2009 | Maeno et al. |
| 2010/0103427 A1 | 4/2010 | Shigematsu et al. |
| 2011/0128601 A1 | 6/2011 | Yamada et al. |

FOREIGN PATENT DOCUMENTS

| DE | 102009049809 | 6/2011 |
| WO | 2008149851 | 12/2008 |

* cited by examiner

*Primary Examiner* — Euncha P Cherry
(74) *Attorney, Agent, or Firm* — JCIPRNET

(57) ABSTRACT

An optical scanning device includes a support portion including a swingable coupling portion and a frame swingably supporting the coupling portion, a first reflecting portion coupled to the coupling portion and configured to swing together with the coupling portion, and a swingable connecting portion including a bridge and a second reflecting portion coupled to the first reflecting portion via the bridge and provided at a position away from the first reflecting portion beyond the support portion.

18 Claims, 15 Drawing Sheets

OPTICAL SCANNING DEVICE

CROSS-REFERENCE TO RELATED APPLICATION

This application claims the priority of japan patent application serial no. 2017-107220 filed on May 30, 2017. The entirety of the above-mentioned patent application is hereby incorporated by reference herein and made a part of this specification.

BACKGROUND

Technical Field

The disclosure relates to an optical scanning device that reflects light emitted from a light source and more particularly to an optical scanning device which can scan a reflecting mirror with low driving power and can perform position detection with high accuracy.

Description of Related Art

A technology in which a measurement target is irradiated with laser light, light reflected from the measurement target is received, and a distance to the measurement target is detected on the basis of information of the reflected light is known in the related art. In this type of technology, when light scanning is performed, usually, both emission of laser light to a target region and reception of light reflected from a measurement target are performed by a scanner mirror composed of a single mirror. Position information of the measurement target is acquired on the basis of the reflection speed and the incident angle of the received reflected light (for example, see Patent Document 1).

In the position detection using the optical scanning device, generally, by receiving as much light reflected from the measurement target as possible, it is possible to suppress variations in the amount of received light, thereby improving the accuracy of detection. Therefore, it is required to employ a light receiving mirror having a large light receiving area. However, in the related-art technology which performs emission of laser light and reception of light reflected from a measurement target using a single mirror, it is necessary to secure a laser light emitting region on a part of the mirror and therefore the size of the light receiving area (light receiving region) of the light receiving mirror is limited.

Further, when emission of laser light and reception of reflected light are performed using a single mirror, direct light incident on the emitting region is easily deflected to the light receiving region and the deflected direct light becomes unnecessary, deteriorating the accuracy of distance measurement.

In FIG. 15, an optical scanning device 8 is shown as an example of the related art. The optical scanning device 8 includes a plate-shaped mirror 81, a plate-shaped fixed portion 82, and hinge portions 83. Upper and lower centers of the mirror 81 are connected to the fixed portion 82 via the hinge portions 83. In the optical scanning device 8, a light emitting region 812 (an optical spot) is allocated at the lower center of the mirror 81. A light receiving region 811 is formed above the light emitting region 812. Therefore, a rectangular region including left and right sides and partial upper and lower portions of the light emitting region 812 at a lower portion of the mirror 81 is an unused region 813.

Laser light from a laser light source (not shown) is reflected at the light emitting region 812 to perform optical scanning along a scan line SLc. Laser light emitted to a measurement target (a fingertip F in FIG. 15) is reflected from the measurement target and the reflected light is then incident on the light receiving region 811. Then, an optical system (not shown) performs predetermined processing on the incident light as measurement light to measure the position of the measurement target (fingertip F) on the surface S of the screen 9.

[Patent Document 1] International PCT Publication No. WO2008/149851

The optical scanning device 8 shown in FIG. 15 has the unused region 813 to avoid interference between light incident on the light emitting region 812 from the laser light source (not shown) and light incident on the light receiving region 811 from the measurement target (fingertip F). The presence of the unused region 813 increases the air resistance of the mirror 81. Therefore, there is a problem in that if the light receiving area of the scanner mirror is increased, the unused region 813 becomes larger and driving power for obtaining a desired deflection angle becomes greater.

SUMMARY

One of the embodiments of the disclosure provides an optical scanning device which can scan a reflecting mirror with low driving power and can also perform position detection with high accuracy.

The inventors have discovered that by providing a second reflecting portion serving as a light emitting mirror at a position separated from a first reflecting portion serving as a light receiving mirror and arranging the second reflecting portion outside a ring-shaped frame of the first reflecting portion, it is possible to eliminate a region not contributing to emission or reception while sufficiently securing a region needed for the first reflecting portion and thus to reduce driving power. From this discovery, the inventor has completed the disclosure.

One of the embodiments of the disclosure provides an optical scanning device includes a support portion including a swingable coupling portion and a frame swingably supporting the coupling portion, a first reflecting portion coupled to the coupling portion and configured to swing together with the coupling portion, and a swingable connecting portion including a bridge and a second reflecting portion coupled to the first reflection portion via the bridge and provided at a position away from the first reflecting portion beyond the support portion.

BRIEF DESCRIPTION OF THE DRAWINGS

FIG. 1(A) is a perspective view showing the entire optical scanning device and FIG. 1(B) is a perspective view showing a connecting portion.

FIG. 5(A) is a perspective view showing the entire optical scanning device 1B and FIG. 5(B) is a perspective view of a connecting portion.

FIG. 6(A) is a perspective view showing the entire optical scanning device 1B' and FIG. 6(B) is a perspective view showing the connecting portion.

FIG. 7(A) is a perspective view showing the entire optical scanning device 1C and FIG. 7(B) is a perspective view showing a connecting portion.

FIG. 9(A) is a perspective view showing the entire optical scanning device 1D and FIG. 9(B) is a perspective view showing a connecting portion.

FIG. 10(A) is a front view of the optical scanning device 1C of the third embodiment and FIG. 10(B) is a front view of the optical scanning device 1D of the fourth embodiment.

FIG. 11(A) is a perspective view showing the entire optical scanning device 1E and FIG. 11(B) is a perspective view showing a connecting portion.

FIG. 12(A) is a front view of the optical scanning device 1E, FIG. 12(B) is a side view of the optical scanning device 1E, and FIG. 12(C) is a cross-sectional view of the optical scanning device 1E in the direction of arrow G in FIG. 12(A).

FIG. 13(A) is a plan view showing the entire optical scanning device 2A and FIG. 13(B) is a plan view showing a substrate which has been subjected to contour processing before a light receiving mirror, a light emitting mirror, and piezoelectric elements are mounted on the substrate.

DESCRIPTION OF THE EMBODIMENTS

According to the disclosure, since the first reflecting portion and the second reflecting portion which are swinging mirrors do not include regions which do not contribute to the emission of light or the reception of light reflected from a measurement target, it is possible to suppress the influence of the air resistance and to achieve a great deflection angle with low driving power. In addition, according to the disclosure, the second reflecting portion serving as a light emitting mirror can be arranged outside of the frame of the support portion. Therefore, for example, when the screen has a touch panel function, it is possible to improve the accuracy of measurement by bringing the position of the second reflecting portion serving as a light emitting mirror closer to the surface of the screen. Moreover, according to the disclosure, the accuracy of distance measurement is not impaired since the second reflecting portion serving as a light emitting mirror and the first reflecting portion serving as a light receiving mirror swing synchronously.

Embodiments of the disclosure will be described below with reference to the drawings.

First Embodiment

Figure 1A:
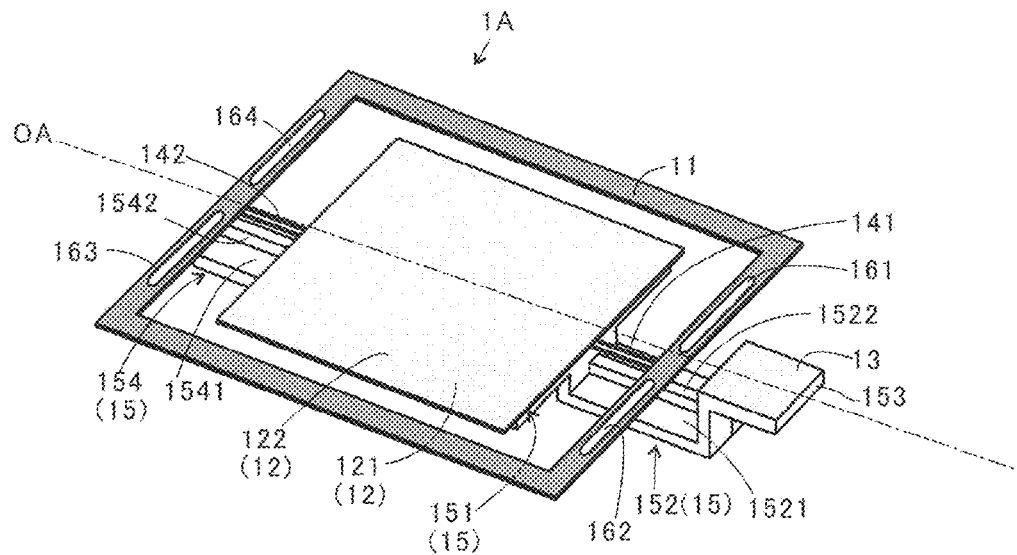
FIGS. 1(A) and 1(B) are views showing an optical scanning device 1A of a first embodiment, where
Figure 1B:
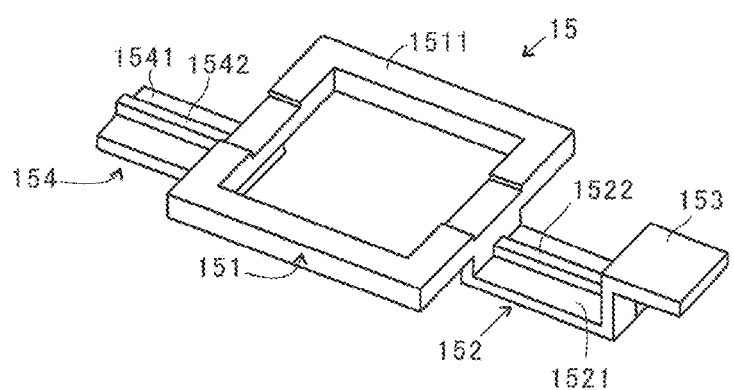

An optical scanning device of a first embodiment will now be described with reference to FIGS. 1 to 3. FIGS. 1(A) and 1(B) are views showing the optical scanning device 1A of the first embodiment, where FIG. 1(A) is a perspective view showing the entire optical scanning device 1A and FIG. 1(B) is a perspective view showing a connecting portion 15. The following description will be based on FIG. 1(A), also referring to FIG. 1(B) as appropriate.

As shown in FIG. 1(A), the optical scanning device 1A includes a support portion having swingable coupling portions 141 and 142 and a frame 11 that swingably supports the coupling portions 141 and 142, a first reflecting portion 12 that is coupled to and swings together with the coupling portions 141 and 142, and a swingable connecting portion 15 coupled to the first reflecting portion 12 and having a second reflecting portion 13 at a position away from the first reflecting portion 12 beyond the support portion.

The support portion of the optical scanning device 1A includes the coupling portion 141, the coupling portion 142 provided opposite to the coupling portion 141, and the frame 11 swingably supporting the coupling portions. The coupling portions 141 and 142 pivotally support the first reflecting portion 12 that swings with respect to the frame 11. The first reflecting portion 12 is coupled to and swings together with the coupling portions 141 and 142. The coupling portions 141 and 142 may be coupled to the first reflecting portion 12 at the centers of two sides orthogonal to a swing axis OA of the first reflecting portion 12. Here, a line connecting the coupling portions 141 and 142 is defined as the swing axis OA.

The first reflecting portion 12 serves as a light receiving mirror. The coupling portions 141 and 142 can be manufactured separately from the first reflecting portion 12 or the frame 11. The coupling portions 141 and 142 can also be manufactured integrally with the first reflecting portion 12 or the frame 11 from the same member. The coupling portions 141 and 142 can also be manufactured integrally with the first reflecting portion 12 and the frame 11 from the same member.

In FIG. 1(A), the line connecting the coupling portions 141 and 142 is shown as the swing axis OA. The coupling portions 141 and 142 are swingable about the swing axis OA. As shown in FIG. 1(A), the frame 11 of the support portion is formed of a member having a rectangular ring shape that is symmetrical with respect to the swing axis OA. The frame 11 typically has a ring shape. When the frame 11 has a ring shape, the ring shape may be closed or open.

The frame 11 may be attached to a substrate (such as an electric circuit board) (not shown). Two piezoelectric elements 161 and 162 and two piezoelectric elements 164 and 164 (whose wirings are not shown) are formed on the frame 11 on two sides thereof perpendicular to the swing axis OA symmetrically with respect to the swing axis OA. In the first embodiment, the first reflecting portion 12 serving as a light receiving mirror and the second reflecting portion 13 serving as a light emitting mirror are swung by the piezoelectric elements 161 and 162 and 163 and 164. However, the first and second reflecting portions 12 and 13 can also be swung by any other appropriate means.

In the first embodiment, a twisting force is generated at the coupling portions 141 and 142 by applying a voltage to each of the piezoelectric elements which are driving sources and this twisting force causes the first reflecting portion 12 serving as a light receiving mirror to swing. The first reflecting portion 12 serving as a light receiving mirror can swing at any frequency of, for example, about 10 Hz to 30 kHz.

Each of the drive sources for swinging may be a piezoelectric element that oscillates by an AC voltage or may be a magnetic body that oscillates by alternating current magnetic fields.

As shown in FIG. 1(A), the first reflecting portion 12 includes a mirror plate 122 provided on a mounting base 151. The first reflecting portion 12 is positioned inside the ring shape of the frame 11. With respect to the frame 11, the first reflecting portion 12 is pivotally supported by the coupling portions 141 and 142 and swings about the swing axis OA. The mirror plate 122 of the first reflecting portion 12 is a reflecting surface for reflecting light and serves as a light receiving mirror. Thus, the mirror plate 122 serves as a reflection layer. For example, a member obtained by vapor-depositing aluminum on a glass substrate or a member employing silicon may be used as the first reflecting portion 12.

The optical scanning device 1A of the first embodiment includes a connecting portion 15. The connecting portion 15 is fixed to rear surfaces of the first and second reflecting portions 12 and 13. As the coupling portions 141 and 142 coupled to the first reflecting portion 12 swing, the connecting portion 15 swings. The connecting portion 15 includes a mounting base 151 serving as a light receiving mirror mount, a bridge 152, a mounting base 153 serving as a light emitting mirror mount, and a dummy portion 154.

The connecting portion 15 may be configured to be symmetrical or asymmetrical with respect to a plane which includes the swing axis OA, passes through the center of the first reflecting portion 12, and is perpendicular to the first reflecting portion 12. As shown in FIG. 1(A), the optical scanning device 1A has a mounting base 153 serving as a light emitting mirror mount only on the coupling portion 141 side of the optical scanning device 1A and is thus configured to be asymmetrical. That is, the connecting portion 15 is not particularly limited in structure as long as the connecting portion 15 can swing synchronously with the coupling portions 141 and 142 coupled to the first reflecting portion 12 as the coupling portions 141 and 142 swing.

The optical scanning device 1A shown in FIG. 1(A) has a mounting base 153 serving as a light emitting mirror mount only on the coupling portion 141 side of the optical scanning device 1A and has a dummy portion 154 provided on the coupling portion 142 side. As described above, the connecting portion 15 of the optical scanning device 1A is configured to be asymmetrical with respect to the plane which includes the swing axis OA, passes through the center of the first reflecting portion 12, and is perpendicular to the first reflecting portion 12. However, provision of the dummy portion 154 corresponding to the mounting base 153 provides a mechanical balance, thus achieving a structure in which the first and second reflecting portions 12 and 13 do not greatly sway in directions other than the twisting direction when the connecting portion 15 swings synchronously with the first and second reflecting portions 12 and 13.

As shown in FIG. 1(A), the bridge 152 is a member which is coupled to the first reflecting portion 12 and has the second reflecting portion 13 at a position away from the first reflecting portion 12 beyond the support portion. The bridge 152 is a swingable member. A part of the bridge 152 may be parallel to the coupling portion 141. The second reflecting portion 13 provided on the bridge 152 serves as a light emitting mirror outside the ring shape of the frame 11.

That is, the second reflecting portion 13 is coupled to the first reflecting portion 12 at a position separated from the first reflecting portion 12 via the bridge 152. The second reflecting portion 13 has a reflecting surface for reflecting light and serves as a light emitting mirror. Thus, the second reflecting portion 13 serves as a reflection layer.

For example, a member obtained by vapor-depositing aluminum on a glass substrate or a member employing silicon may be used as the second reflecting portion 13, similar to the first reflecting portion 12. The distance from the surface of the first reflecting portion 12 serving as a light receiving mirror to the swing axis OA and the distance from the surface of the second reflecting portion 13 serving as a light emitting mirror to the swing axis OA may be equal or different.

As shown in FIG. 1(A), each of the first and second reflecting portions 12 and 13 has a reflecting surface for reflecting light and the reflecting surface of the first reflecting portion 12 is greater than the reflecting surface of the second reflecting portion 13. The size of the first reflecting portion 12 serving as a light receiving mirror, the size of the second reflecting portion 13 serving as a light emitting mirror, and the distance between the first and second reflecting portions 12 and 13 are not particularly limited.

The size of the first reflecting portion 12 can be set appropriately according to the overall specification of the optical scanning device 1A. The size of the first reflecting portion 12 of the optical scanning device 1A shown in FIG. 1(A) is 20×25 mm and the size of the second reflecting portion 13 is 6.0×6.0 mm. The distance between the first and second reflecting portions 12 and 13 is 7.5 mm and the distance from a reinforcing rib 1522 provided on the bridge 152 to the frame 11 is 2.65 mm. The size of the optical scanning device 1A shown in FIG. 1(A) is not limited to this. For example, the size of the first reflecting portion 12 can be set to (10 to 30)×(20 to 40) mm and the size of the second reflecting portion 13 can be set to (3 to 9)×(3 to 9) mm. The distance between the first reflecting portion 12 and the second reflecting portion 13 is not particularly limited as long as it can secure a sufficient distance to prevent light emitted from the second reflecting portion 13 from being deflected to the first reflecting portion 12. For example, the distance between the first and second reflecting portions 12 and 13 can be set to 2.00 to 4.50 mm.

The first reflecting portion 12 is supported by the mounting base 151 on which a reflecting layer for reflecting light is mounted. The second reflecting portion 13 is supported by the mounting base 153 on which a reflecting layer for reflecting light is mounted. That is, each of the first and second reflecting portions 12 and 13 is supported by a mounting base on which a reflection layer for reflecting light is mounted.

These mounting bases may be flat or protruding. The mounting base 151 is a portion for mounting the first reflecting portion 12 serving as a light receiving mirror. The mounting base 151 is a rectangular ring body 1511 which is smaller than the size of the first reflecting portion 12 in plan view.

The bridge 152 is a member that bridges and couples the first and second reflecting portions 12 and 13 and is configured to include the swing axis OA. The bridge 152 has a shape that straddles one or two sides of the frame 11.

As shown in FIG. 1(B), a part of the bridge 152 which straddles the frame 11 (a part thereof directly beneath the frame 11) is constituted by a connecting plate 1521 spaced apart from the swing axis OA such that the bridge 152 does not contact or collide with the frame 11 when the first reflecting portion 12 swings. A reinforcing rib 1522 is provided on the connecting plate 1521 which constitutes the bridge 152. The reinforcing rib 1522 is provided to prevent deviation of the mounting angles of emission and reception from each other. The material that can be used for the reinforcing rib 1522 may be a material with little change over time and low hygroscopicity. The bridge 152 may have a strength to withstand swinging. The bridge 152 may be formed of synthetic resin or may be formed of metal.

For example, when the frame 11 has a closed quadrilateral ring shape, the bridge 152 is configured to straddle one side of the quadrangular frame 11 from the inside to the outside thereof and the second reflecting portion 13 is provided outside the ring of the frame 11. For example, when the frame 11 has an open ring shape, the bridge 152 is configured to traverse the open portion from the inside to the outside and the second reflecting portion 13 is provided outside the ring.

The bridge 152 is engaged with the mounting base 153 which mounts the reflection layer of the second reflecting portion 13 serving as a light emitting mirror. The mounting base 153 supporting the second reflecting portion 13 mounts the reflecting layer of the second reflecting portion 13 serving as a light emitting mirror. The mounting base 153 is formed as a protrusion in the present embodiment. The height of an upper surface of the mounting base 153 may be the same as the height of an upper surface of the rectangular ring body 1511 of the mounting base 151 serving as a light receiving mirror mount. The height of the upper surface of the mounting base 153 may also be made lower or higher than that of the upper surface of the rectangular ring body 1511.

As shown in FIG. 1(B), the mounting base 153 has a rectangular plate shape. The upper surface of the mounting base 153 is made higher than the upper surface of the rectangular ring body 1511 of the mounting base 151. Thus, the second reflecting portion 13 serving as a light emitting mirror is disposed at a higher position than the first reflecting portion 12 serving as a light receiving mirror. Therefore, direct light incident on the second reflecting portion 13 serving as a light emitting mirror is not easily deflected to the first reflecting portion 12 serving as a light receiving mirror, thus reducing unnecessary light incident on the first reflecting portion 12. By making the angle between the reflecting surface of the light receiving mirror (a first reflecting portion) 12 and the reflecting surface of the light emitting mirror (a second reflecting portion) 13 equal to or less than 180 degrees, it is possible to freely change the light receiving and emitting angles as appropriate depending on a measurement target and measurement conditions.

A light shielding material for shielding light between the first reflecting portion 12 serving as a light receiving mirror and the second reflecting portion 13 serving as a light emitting mirror may be provided on the mounting base 153. The light shielding material may be made as a part of the mounting base 153. Alternatively, a plate-shaped body may be attached to the mounting base 153 and may be used as a light shielding material. By doing so, it is possible to prevent the emitted light from being directly received, thus improving the accuracy of distance measurement.

As shown in FIG. 1(B), the optical scanning device 1A of the first embodiment includes the dummy portion 154. The dummy portion 154 is provided on the side opposite to the mounting base 153 that mounts the second reflecting portion 13 serving as a light emitting mirror. With the dummy portion 154, it is possible to achieve a balance with the weight of the side having the mounting base 153.

The dummy portion 154 has the same configuration as that obtained by removing from the side having the mounting base 153 a part starting from an intermediate portion of the connecting plate 1521 of the bridge 152 up to the mounting base 153 serving as a light emitting mirror mount. The dummy portion 154 is provided to achieve a mechanical balance with the bridge 152 and the mounting base 153. The dummy portion 154 may have the same mass as the mounting base 153. However, without being limited to this, it is possible to achieve a swing balance even when the mass of the dummy portion 154 is smaller than that of the mounting base 153.

As shown in FIG. 1(B), the dummy portion 154 includes a connecting plate 1541 corresponding to the connecting plate 1521 and a reinforcing rib 1542 corresponding to the reinforcing rib 1522. With the above configuration, the first reflecting portion 12 serving as a light receiving mirror and the second reflecting portion 13 serving as a light emitting mirror can coaxially swing on the swing axis OA and can swing synchronously.

Figure 2:
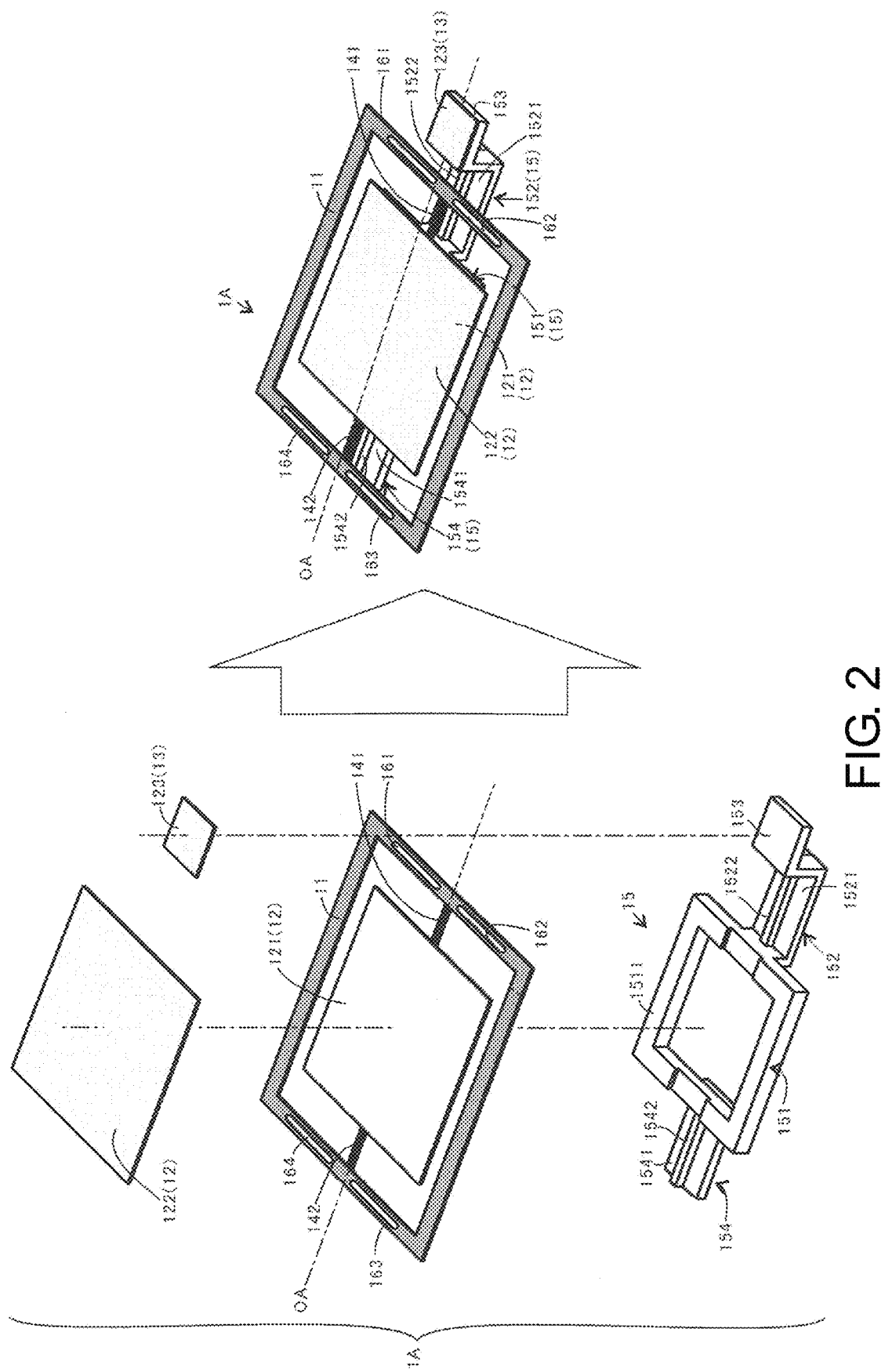
FIG. 2 is a diagram showing constituent members and a configuration of the optical scanning device 1A.

FIG. 2 is a diagram showing members constituting the optical scanning device 1A of the first embodiment and the structure thereof. As shown in FIG. 2, the first reflecting portion 12 of the optical scanning device 1A is fixed to the upper surface of the rectangular ring body 1511 of the mounting base 151 on the connecting portion 15.

The second reflecting portion 13 of the optical scanning device 1A includes a mirror plate 123 which is mounted on and fixed to the mounting base 153 of the connecting portion 15. Thus, the mirror plate 123 is mounted on the upper surface of the second reflecting portion 13. The mirror plate 123 serves as a reflecting surface of the second reflecting portion 13. The thicknesses of the mirror plates 122 and 123 may be the same or different.

Figure 3:
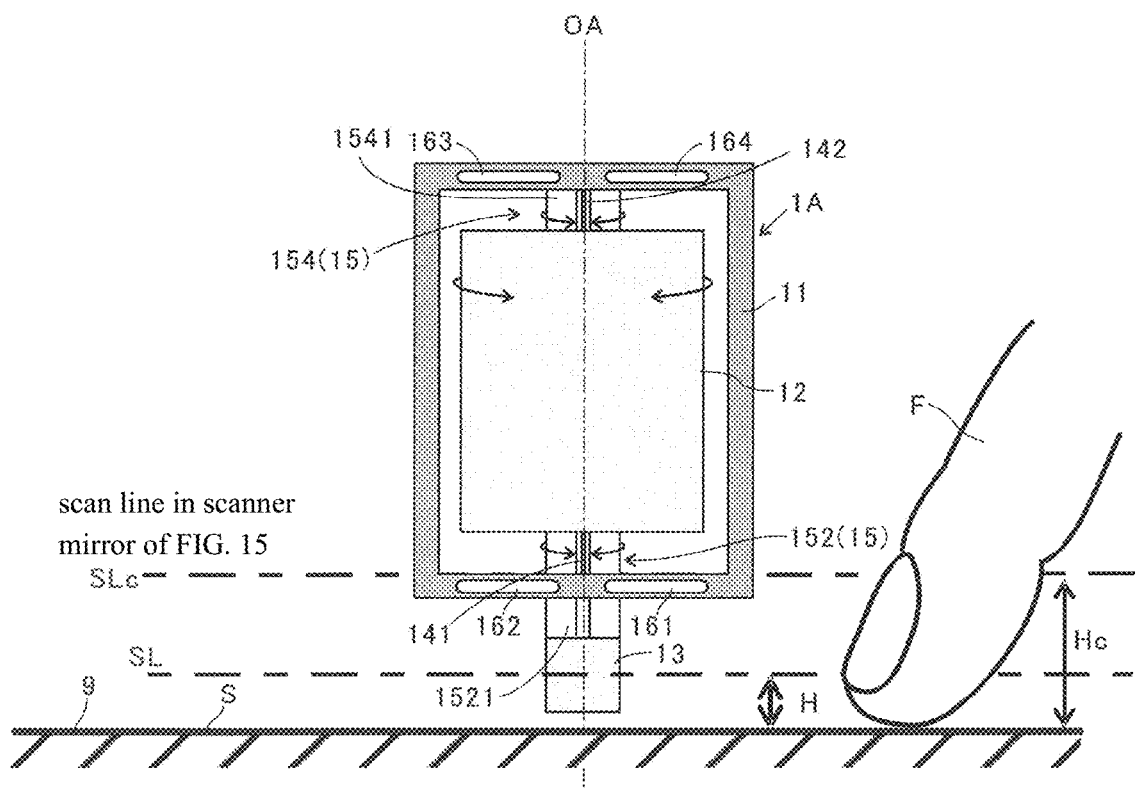
FIG. 3 is a diagram showing the operation of the optical scanning device 1A.

FIG. 3 is a diagram showing the operation of the optical scanning device 1A. As shown in FIG. 3, the optical scanning device 1A is disposed such that the swing axis OA is perpendicular to a screen 9. In the optical scanning device 1A, power transmitted through the frame 11 causes the coupling portions 141 and 142 to twist. This allows the first reflecting portion 12, the bridge 152, and the second reflecting portion 13 to swing integrally. That is, the first and second reflecting portions 12 and 13 swing synchronously.

Laser light from a laser light source (not shown) is reflected at the second reflecting portion 13 toward a region to be scanned and is scanned along a scan line SL. The laser light emitted to a measurement target (a fingertip F in FIG. 3) is reflected toward the optical scanning device upon hitting the target and the reflected light is received by the first reflecting portion 12. The light reflected by the first reflecting portion 12 is received by an optical system (not shown) as measurement light, whereby the position and angle of the target from the measurement device can be detected. Thus, the position of the measurement target (the fingertip F) on a surface S of the screen 9 is measured.

Figure 4:
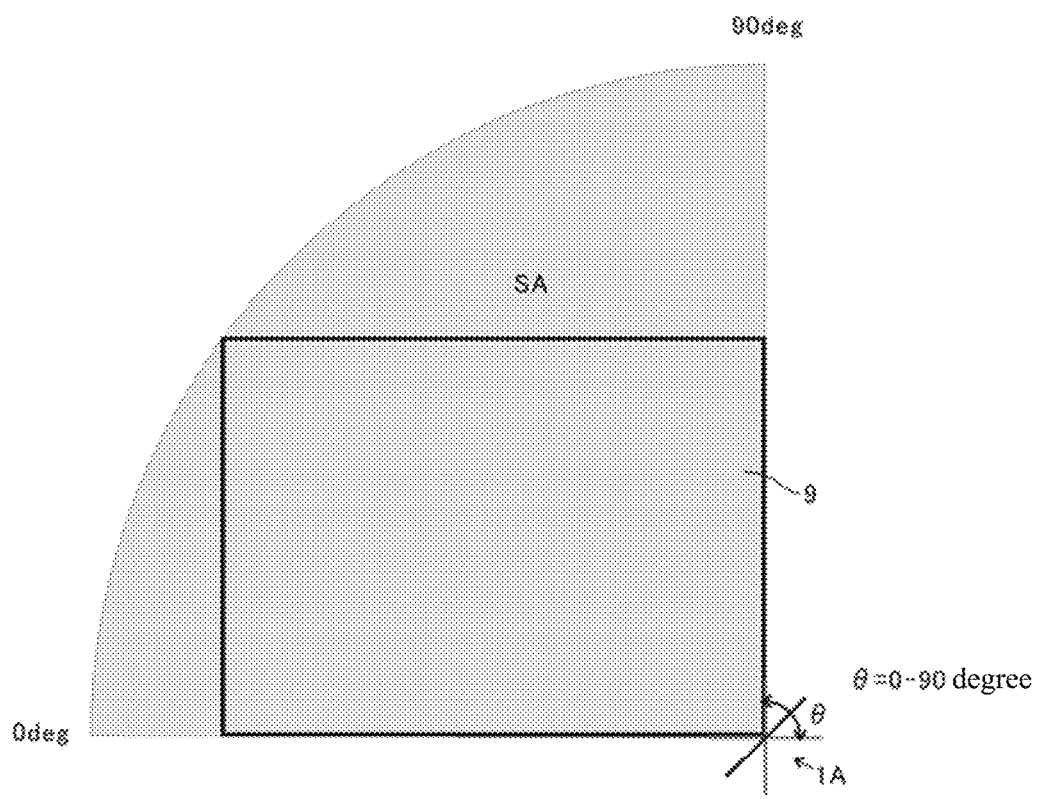
FIG. 4 is a diagram showing usage of the optical scanning device 1A.

In the optical scanning device 1A of the first embodiment, the second reflecting portion 13 is positioned outside the frame 11 having a rectangular ring shape. Therefore, a height H to the scan line SL from the surface S of the screen 9 can be made lower than a height Hc to the related-art scan line SLc shown in FIG. 3. FIG. 4 is a diagram showing usage of the optical scanning device 1A. As shown in FIG. 4, the optical scanning device 1A is disposed at a corner of the screen 9 and can therefore measure the whole area of the screen 9 by operating at a scanning angle θ in a range SA of 0 degrees to 90 degrees.

Second Embodiment

Figure 5A:
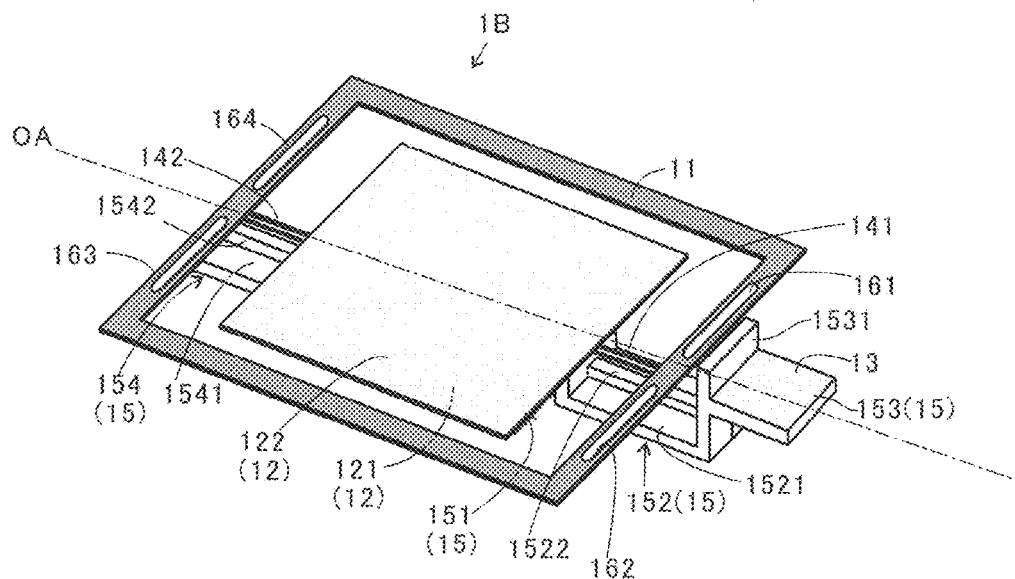
FIGS. 5(A) and 5(B) are views showing an optical scanning device 1B of a second embodiment of the disclosure, where
Figure 5B:
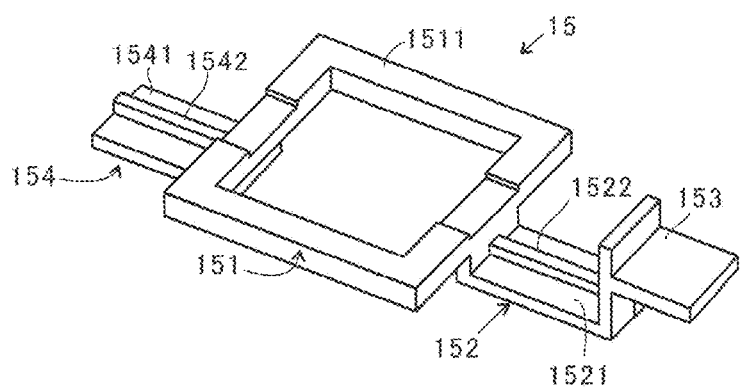

FIGS. 5(A) and 5(B) are views showing an optical scanning device 1B of a second embodiment of the disclosure, where FIG. 5(A) is a perspective view showing the entire optical scanning device 1B and FIG. 5(B) is a perspective view showing a connecting portion 15. The following description will be based on FIG. 5(A), also referring to FIG. 5(B) as appropriate.

As shown in FIGS. 5(A) and 5(B), the optical scanning device 1B of the second embodiment differs from the optical scanning device 1A of the first embodiment only in the configuration of the mounting base 153 serving as a light emitting mirror mount.

In the optical scanning device 1B, a light shielding wall 1531 is formed on the bridge 152 side of the mounting base 153. Due to the formation of the light shielding wall 1531, when light emitted from a light source (not shown) is reflected toward a predetermined region by the second reflecting portion 13 serving as a light emitting mirror, stray light from the second reflecting portion 13 can be prevented from reaching the first reflecting portion 12 serving as a light receiving mirror.

In this manner, with the light shielding wall 1531, it is possible to reduce the amount of light that is deflected to the first reflecting portion 12, which serves as a light receiving mirror, among light emitted from the second reflecting portion 13. As a result, it is possible to reduce light emitted from the second reflecting portion 13 that the first reflecting portion 12 receives as noise light, thus improving the accuracy of distance measurement of the optical scanning device 1B. Further, when the second reflecting portion 13 is attached to the mounting base 153, the light shielding wall 1531 can be used as a reference for the attachment. Therefore, it is easy to determine the position of the light emitting mirror 13 on the mounting base 153 when attaching the light emitting mirror 13 to the mounting base 153.

Figure 6A:
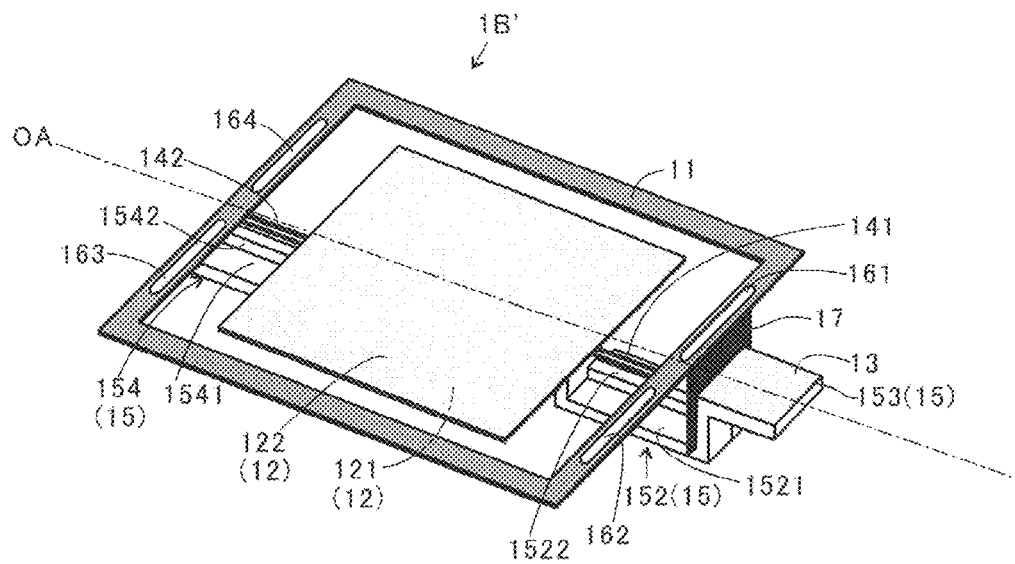
FIGS. 6(A) and 6(B) are views showing a modification of the optical scanning device 1B (an optical scanning device 1B') of the second embodiment, where
Figure 6B:
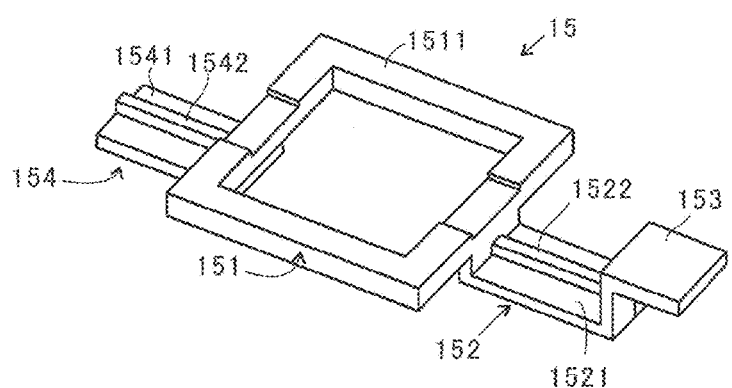

FIGS. 6(A) and 6(B) are views showing a modification of the optical scanning device 1B (an optical scanning device 1B') of the second embodiment, where FIG. 6(A) is a perspective view showing the entire optical scanning device 1B' and FIG. 6(B) is a perspective view showing a connecting portion 15.

As shown in FIGS. 6(A) and 6(B), the optical scanning device 1B' of the second embodiment is formed by adhering a light shielding plate 17 to the mounting base 153 serving as a light emitting mirror mount of the optical scanning device 1A of the first embodiment.

When using the light shielding plate 17, it is possible to enlarge the light shielding region without complicating the structure of the bridge 152.

In the second embodiment, similar to the light shielding wall 1531 in FIGS. 5(A) and 5(B), the light shielding plate 17 can reduce the amount of light that is deflected to the first reflecting portion 12, which serves as a light receiving mirror, among light emitted from the second reflecting portion 13. As a result, it is possible to reduce light emitted from the second reflecting portion 13 that the first reflecting portion 12 receives as noise light, thus improving the accuracy of distance measurement of the optical scanning device 1B'. Further, in the second embodiment, when the second reflecting portion 13 serving as a light receiving mirror is attached to the mounting base 153, the light shielding plate 17 makes it easy to determine the position of the light emitting mirror 13 on the mounting base 153.

Third Embodiment

Figure 7A:
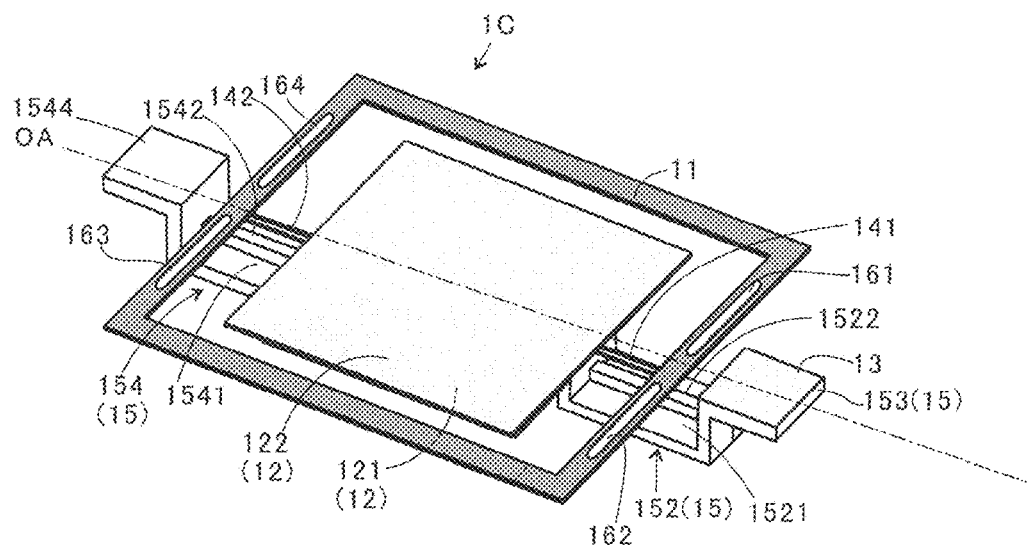
FIGS. 7(A) and 7(B) are views showing an optical scanning device 1C of a third embodiment, where
Figure 7B:
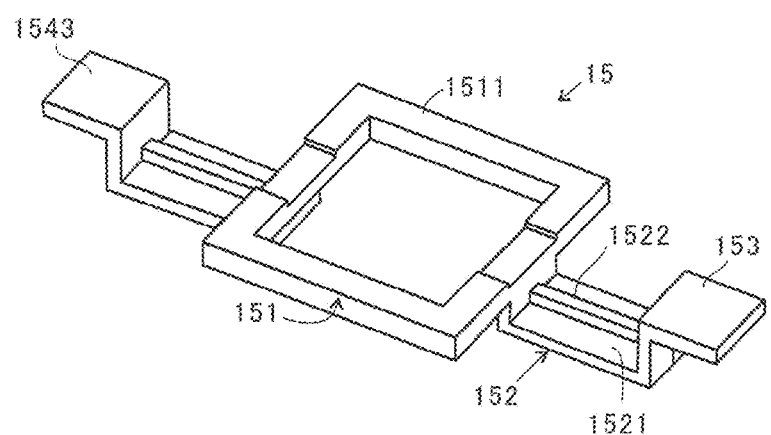

FIGS. 7(A) and 7(B) are views showing an optical scanning device 1C of a third embodiment, where FIG. 7(A) is a perspective view showing the entire optical scanning device 1C and FIG. 7(B) is a perspective view showing a connecting portion 15.

As shown in FIGS. 7(A) and 7(B), the optical scanning device 1C of the third embodiment differs from the optical scanning device 1A of the first embodiment only in the configuration of the dummy portion 154.

Figure 8:
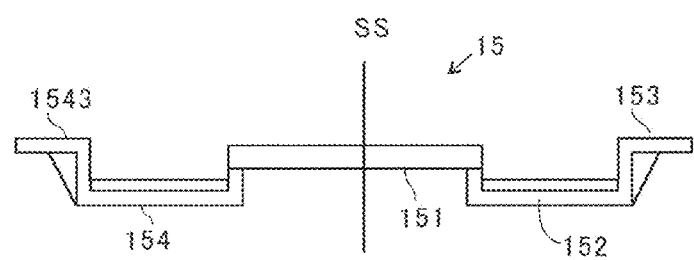
FIG. 8 is a side view of the connecting portion in the optical scanning device of the third embodiment.

FIG. 8 is a side view of the connecting portion 15 in the third embodiment. In the third embodiment, as shown in FIG. 8, the connecting portion 15 is configured to be symmetrical with respect to a plane SS which passes through the center of the first reflecting portion 12 serving as a light receiving mirror and is perpendicular to the first reflecting portion 12 not shown in FIG. 8 (see FIGS. 7(A) and 7(B)).

The connecting portion 15 has the mounting base 153, which serves as a light emitting mirror mount, and the dummy portion 154 with respect to the plane SS perpendicular to the first reflecting portion 12 as shown in FIG. 8. A dummy tip portion 1543 is provided at the tip of the dummy portion 154.

A mirror member such as a mirror plate may be mounted on either a front surface or a rear surface of the dummy tip portion 1543. Separately from the light for measurement emitted from the second reflecting portion 13, a different light beam for deflection angle detection may be emitted to the mirror member and then light reflected from the mirror member provided on the dummy tip portion 1543 may be detected to detect the deflection angle of the first reflecting portion 12.

The optical scanning device 1C of the third embodiment is provided with the bridge 152 and the mounting base 153 on the coupling portion 141 side and the dummy portion 154 and the dummy tip portion 1543 on the coupling portion 142 side such that the connecting portion 15 is configured to be symmetrical with respect to the plane SS perpendicular to the first reflecting portion 12, thereby realizing an optical scanning device without degrading scanning characteristics.

Fourth Embodiment

Figure 9A:
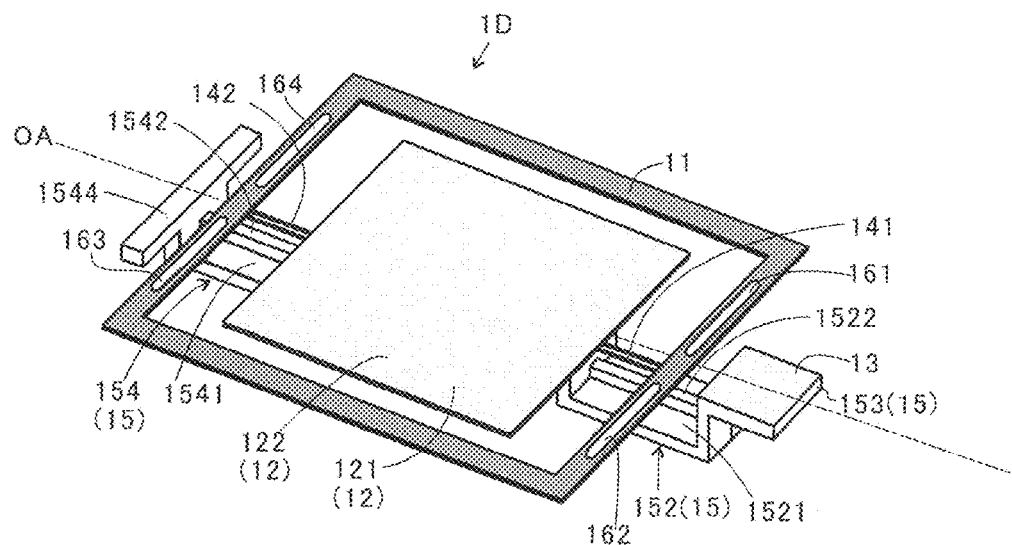
FIGS. 9(A) and 9(B) are views showing an optical scanning device 1D of a fourth embodiment, where
Figure 9B:
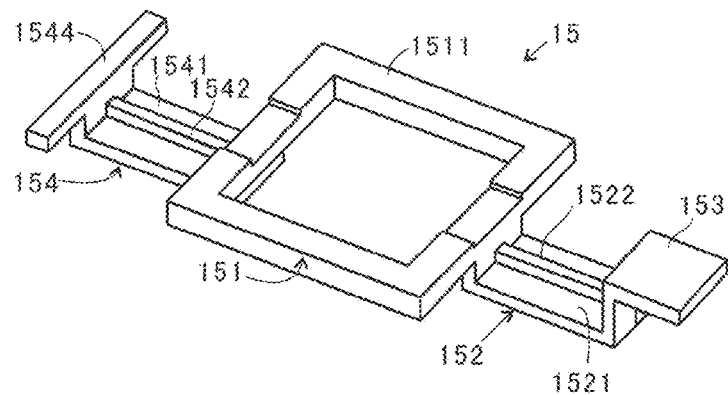

FIGS. 9(A) and 9(B) are views showing an optical scanning device 1D of a fourth embodiment, where FIG. 9(A) is a perspective view showing the entire optical scanning device 1D and FIG. 9(B) is a perspective view showing a connecting portion 15.

As shown in FIGS. 9(A) and 9(B), the optical scanning device 1D of the fourth embodiment has a dummy portion 154 with a tip shape different from that of the optical scanning device 1C of the third embodiment.

A dummy tip portion 1544 of the dummy portion 154 of the fourth embodiment is shorter in the direction of the swing axis OA and longer in the direction perpendicular to the swing axis OA than the dummy tip portion 1543 of the third embodiment. The dummy tip portion 1544 is configured to have a volume which makes the weights of the second reflecting portion 13 side (the light emitting mirror side) and the dummy portion 154 side with respect to the center of the first reflecting portion 12 (the light receiving mirror) approximately equal.

Thus, in the optical scanning device 1D of the fourth embodiment, swinging of the first reflecting portion 12 is stabilized and excellent scanning characteristics can be achieved.

Figures 10A, 10B:
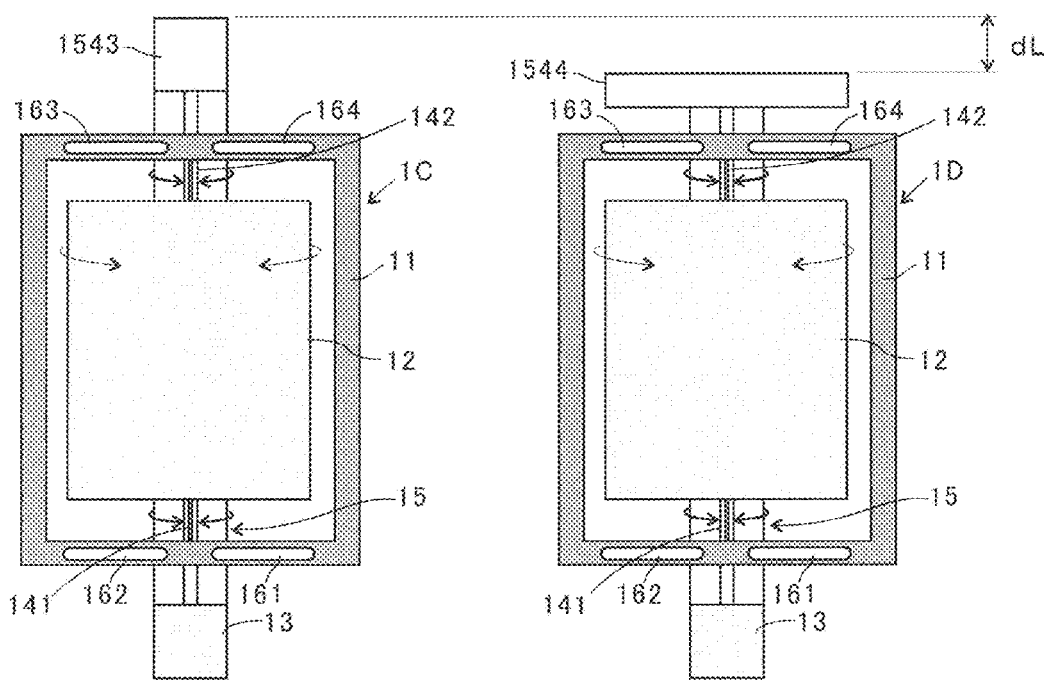
FIGS. 10(A) and 10(B) are views illustrating features of the optical scanning device 1D of the fourth embodiment, where

FIGS. 10(A) and 10(B) are views illustrating features of the optical scanning device 1D of the fourth embodiment, where FIG. 10(A) is a front view of the optical scanning device 1C of the third embodiment and FIG. 10(B) is a front view of the optical scanning device 1D of the fourth embodiment. As is apparent from FIGS. 10(A) and 10(B), the optical scanning device 1D is smaller than the optical scanning device 1C and it is thus possible to downsize products mounting the optical scanning device 1D.

In FIGS. 10(A) and 10(B), the difference in size between the optical scanning device 1C and the optical scanning device 1D is indicated by dL.

Fifth Embodiment

Figure 11A:
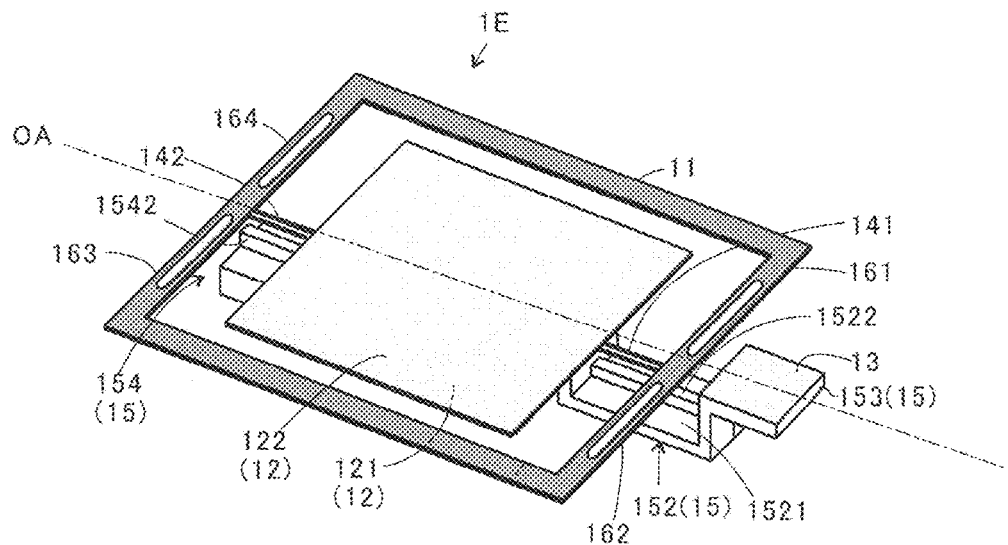
FIGS. 11(A) and 11(B) are views showing an optical scanning device 1E of a fifth embodiment, where
Figure 11B:
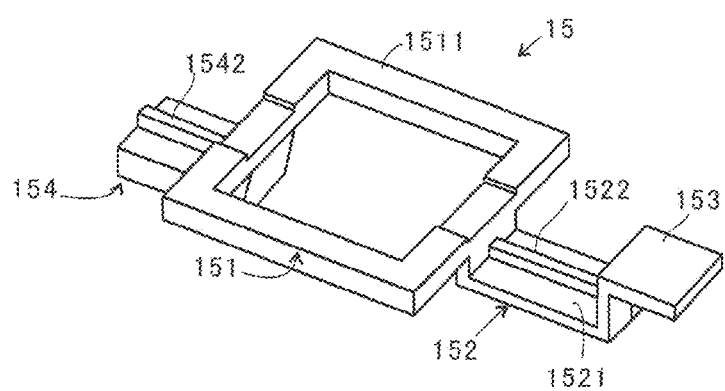

FIGS. 11(A) and 11(B) are views showing an optical scanning device 1E of a fifth embodiment, where FIG. 11(A) is a perspective view showing the entire optical scanning device 1E and FIG. 11(B) is a perspective view showing a connecting portion 15. As shown in FIGS. 11(A) and 11(B), the optical scanning device 1E of the fifth embodiment differs from the optical scanning device 1A of the first embodiment in the thickness of the dummy portion 154.

Figure 12A:
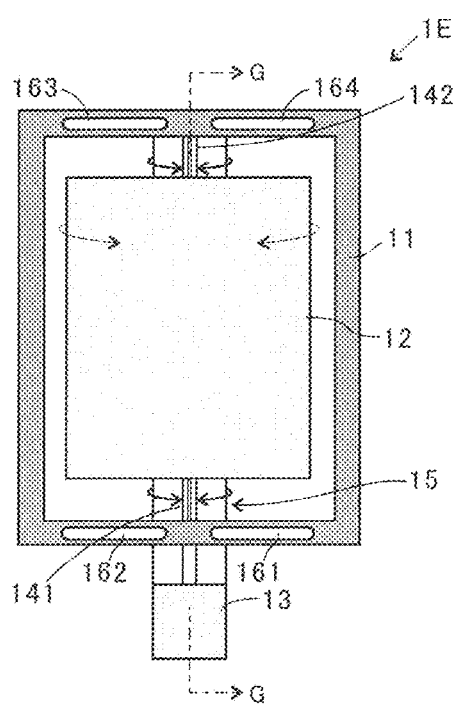
FIGS. 12(A) to 12(C) are views illustrating features of the optical scanning device 1E of the fifth embodiment, where
Figure 12B:
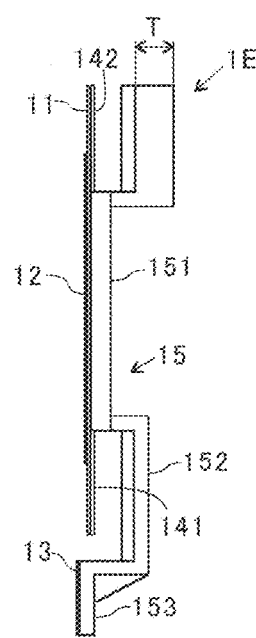
Figure 12C:
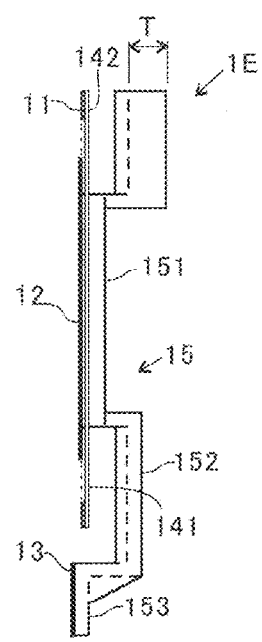

FIGS. 12(A) to 12(C) are views illustrating features of the optical scanning device 1E of the fifth embodiment, where FIG. 12(A) is a front view of the optical scanning device 1E, FIG. 12(B) is a side view of the optical scanning device 1E, and FIG. 12(C) is a cross-sectional view of the optical scanning device 1E in the direction of arrow G in FIG. 12(A).

In the optical scanning device 1E of the fifth embodiment, the connecting portion 15 of the dummy portion 154 has a great thickness T such that the weights of the second reflecting portion 13 side (the light emitting mirror side) and the dummy portion 154 side with respect to the center of the first reflecting portion 12 (the light receiving mirror) are made approximately equal.

Thus, in the optical scanning device 1E of the fifth embodiment, swinging of the first reflecting portion 12 is stabilized and excellent scanning characteristics can be achieved.

Sixth Embodiment

Figure 13A:
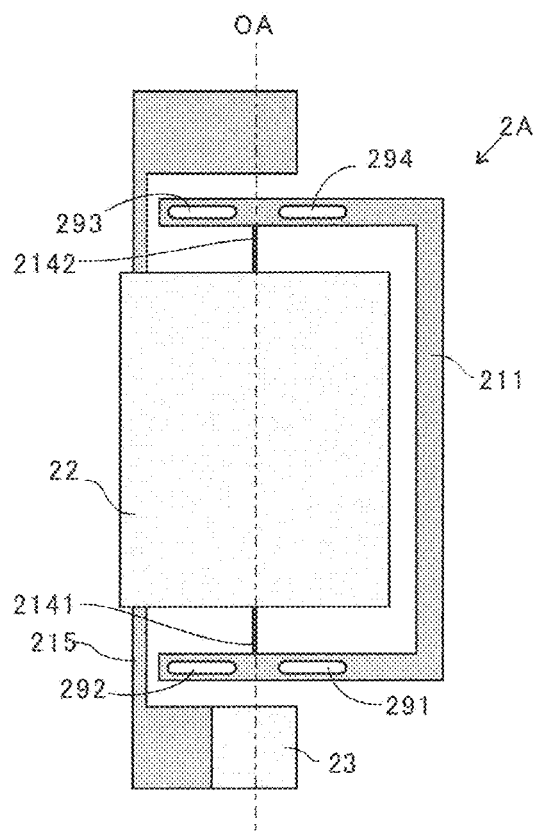
FIGS. 13(A) and 13(B) are views showing an optical scanning device 2A of a sixth embodiment, where
Figure 13B:
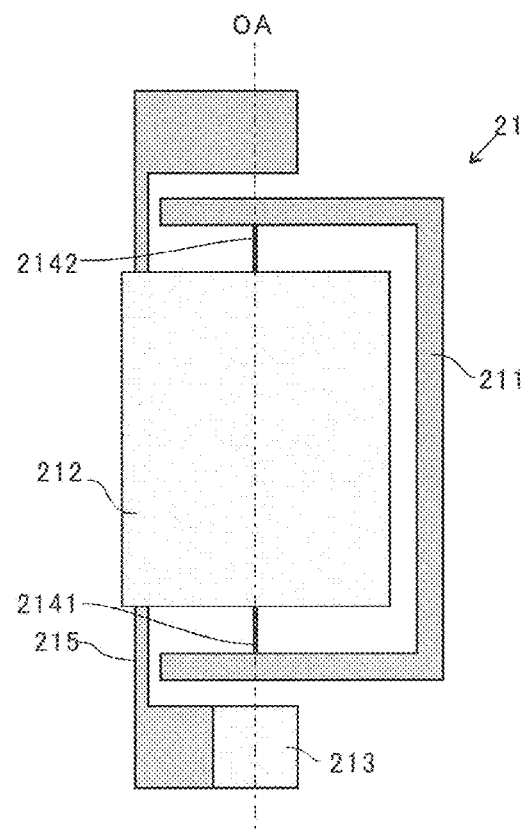

FIGS. 13(A) and 13(B) are views showing an optical scanning device 2A of a sixth embodiment, where FIG. 13(A) is a plan view showing the entire optical scanning device 2A and FIG. 13(B) is a plan view showing a substrate 21 which has been subjected to contour processing before a light receiving mirror, a light emitting mirror, and piezoelectric elements are mounted on the substrate 21.

As shown in FIG. 13(A), the substrate 21 manufactured through etching processing is used as a support portion in the optical scanning device 2A of the sixth embodiment. The optical scanning device 2A of the sixth embodiment is manufactured by adhering a light receiving mirror 22 (a first reflecting portion) and an emission light mirror 23 (a second reflecting portion) to the substrate 21 (shown in FIG. 13(B)) and also forming piezoelectric elements 291, 292, 293, and 294 on the substrate 21.

The substrate 21 includes a fixed portion (frame) 211, a light receiving mirror mount (mounting base) 212, a light emitting mirror mount (mounting base) 213, hinge portions (coupling portions) 2141 and 2142, and a bridge 215. As shown in FIG. 13(A), the fixed portion (frame) 211 is a U-shaped ring (arranged horizontally in FIG. 13(A)) having corners of 90 degrees which is attached to a substrate such as an electric circuit board (not shown).

A rectangular light receiving mirror mount (mounting base) 212 is formed inside the horizontally arranged U-shaped ring (fixed portion (frame) 211). Midpoints of upper and lower sides of the light receiving mirror mount (mounting base) 212 are continuous to both arms of the horizontally arranged U-shaped ring via hinge portions (coupling portions) 2141 and 2142 and the light receiving mirror mount (mounting base) 212 is pivotally supported by the hinge portions (coupling portions) 2141 and 2142 on the fixed portion (frame) 211. A vertical line passing through the hinge portions (coupling portions) 2141 and 2142 corresponds to the swing axis OA.

The light emitting mirror mount (mounting base) 213 has a rectangular shape smaller than the light receiving mirror mount (mounting base) 212. The light emitting mirror mount (mounting base) 213 is connected to the light receiving mirror mount (mounting base) 212 at a position which is outside the U-shaped ring shape of the fixed portion (frame) 211 and is separated from the light receiving mirror mount (mounting base) 212, via the bridge 215. In the fixed portion (frame) 211, two piezoelectric elements 291 and 292 and two piezoelectric elements 293 and 294 (whose wirings are not shown) are provided on both arms of the horizontally arranged U-shaped ring symmetrically with respect to the swing axis OA.

In the sixth embodiment, the angle formed between a reflecting surface of the light receiving mirror (the first reflecting portion) 22 and a reflecting surface of the light emitting mirror (the second reflecting portion) 23 is 0 degrees. In the disclosure, this angle can be arbitrarily set. For example, the angle formed between the reflecting surface of the light receiving mirror (the first reflecting portion) 22 and the reflecting surface of the light emitting mirror (the second reflecting portion) 23 may be any angle from 0 degrees to 180 degrees. Thus, the angle at which light emitted from a light source (not shown) is reflected toward a predetermined region from the light emitting mirror (the second reflecting portion) 23 can also be changed to a desired angle.

That is, in the optical scanning device of the sixth embodiment, the incident angle of light emitted to a predetermined region from the emission light mirror (the second reflecting portion) 23 can be appropriately set according to the shape of the measurement target and measurement conditions. In the optical scanning device of the sixth embodiment, the angle at which the reflected light is received by the light receiving mirror (the first reflecting portion) 22 that receives the light emitted from the light emitting mirror (the second reflecting portion) 23 can also be appropriately set. Thus, the optical scanning device of the sixth embodiment can sufficiently secure a region needed for the light receiving mirror (the first reflecting portion) 22.

In the sixth embodiment, the light receiving mirror (the first reflecting portion) 22 is a mirror plate and is adhered to the light receiving mirror mount (mounting base) 212.

Figure 14:
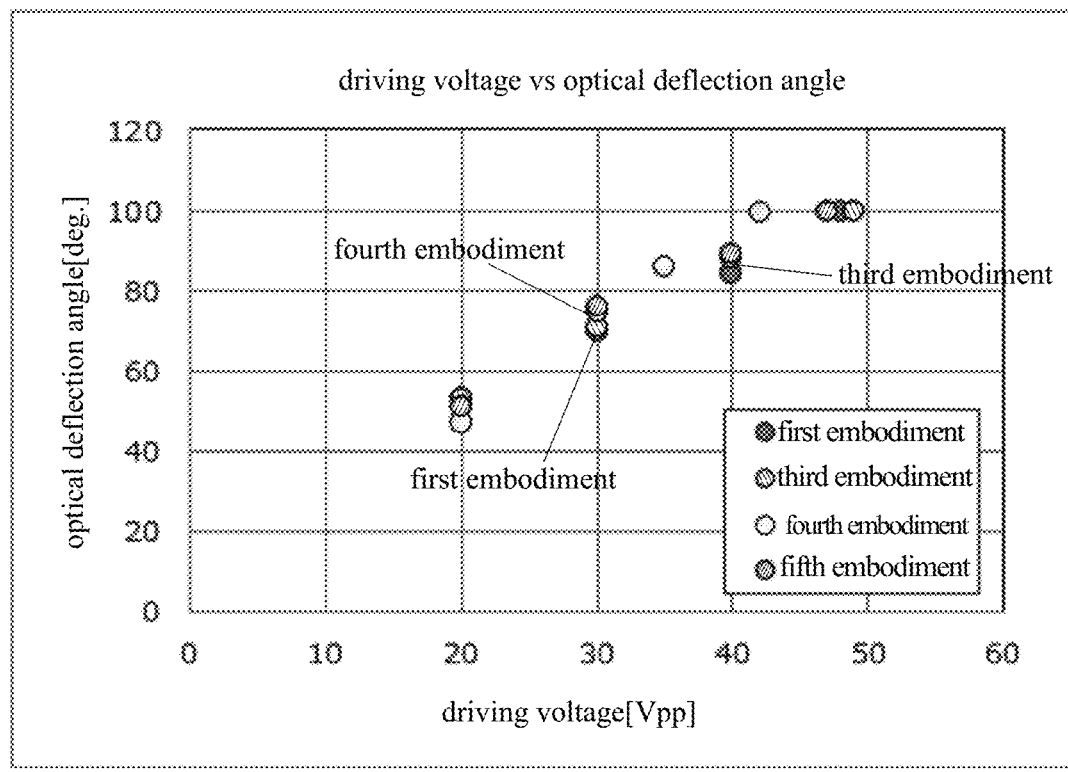
FIG. 14 is a graph showing experimental results on the relationship between driving voltages (Vpp) and optical deflection angles (deg.) of the optical scanning device 1A of the first embodiment, the optical scanning device 1C of the third embodiment, the optical scanning device 1D of the fourth embodiment, and the optical scanning device 1E of the fifth embodiment.
Figure 15:
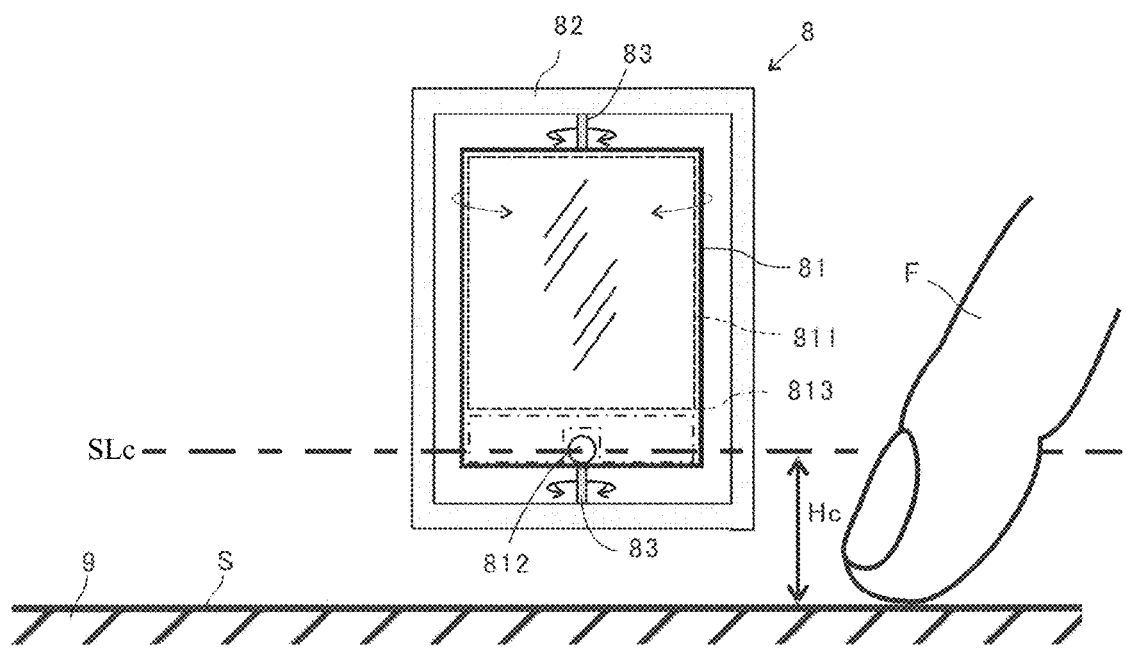
FIG. 15 is an explanatory view showing a use state of a related-art optical scanning device.

FIG. 14 is a graph showing experimental results on the relationship between driving voltages (Vpp) and optical deflection angles (deg.) of the optical scanning device 1A of the first embodiment, the optical scanning device 1C of the third embodiment, the optical scanning device 1D of the fourth embodiment, and the optical scanning device 1E of the fifth embodiment. For example, in these embodiments of the disclosure, optical deflection angles of 90 degrees or more are made at driving voltages of about 35 to 40 [Vpp] as can be seen from FIG. 14, thus proving that it is possible to obtain a great deflection angle at a low voltage.

That is, in the optical scanning device of the disclosure, the light emitting mirror is provided at a position separated from the light receiving mirror and is arranged outside the ring-shaped frame of the light receiving mirror, such that it is possible to eliminate a region not contributing to emission or reception while sufficiently securing a region needed for the light receiving mirror. In the optical scanning device of the disclosure, an optical deflection angle of the light receiving mirror can be made almost 100 degrees with driving power at a driving voltage of about 40 to 50 [Vpp].

The optical scanning device of the disclosure can obtain a deflection angle of the light receiving mirror of 90 degrees or more even at a driving voltage of about 40 [Vpp] while sufficiently securing the size of the light receiving mirror having a large area of about 2 cm. That is, the optical scanning device of the disclosure has great technical significance in that it is possible to obtain a great deflection angle of a large-area light receiving mirror with low driving power and also to perform position detection with high accuracy.

The optical scanning device of the disclosure can be widely used as a reflection device that scans light over a predetermined region and receives light reflected from a target. In particular, the optical scanning device of the disclosure can be used as an optical sensor, a distance measurement sensor, or an in-vehicle sensor.

The optical scanning device of the disclosure can be applied to electrical-related industries, automobile industries, and industries relating to automotive electrical equipment since the optical scanning device of the disclosure can scan a large-area light receiving mirror with low driving power and can also perform position detection with high accuracy.

Although the embodiments of the disclosure have been described above, the disclosure is not limited to the above embodiments and variables or the like that do not depart from the gist of the disclosure are all within the scope of the disclosure.

What is claimed is:

1. An optical scanning device comprising:
   a support portion including a swingable coupling portion and a frame swingably supporting the coupling portion;
   a first reflecting portion coupled to the coupling portion and configured to swing together with the coupling portion; and
   a swingable connecting portion including a bridge and a second reflecting portion coupled to the first reflecting portion via the bridge and provided at a position away from the first reflecting portion beyond the support portion,
   wherein the connecting portion has a first mounting base on which the first reflecting portion is mounted and a second mounting base on which the second reflecting portion is mounted, and an upper surface of the second mounting base is configured higher than an upper surface of the first mounting base, and thus the second reflecting portion is disposed higher than the first reflecting portion.

2. The optical scanning device according to claim 1, wherein the first reflecting portion is positioned inside the frame and is supported by the coupling portion such that the first reflecting portion swings with respect to the frame, and the second reflecting portion is disposed at a position spaced apart from the first reflecting portion in a direction of a swing axis via the bridge.

3. The optical scanning device according to claim 1, wherein each of the first reflecting portion and the second reflecting portion has a reflecting surface for reflecting light and the reflecting surface of the first reflecting portion is greater than the reflecting surface of the second reflecting portion.

4. The optical scanning device according to claim 2, wherein the coupling portion is coupled to the first reflecting portion at respective centers of two sides orthogonal to the swing axis of the first reflecting portion.

5. The optical scanning device according to claim 1, wherein a part of the bridge is parallel to the coupling portion.

6. The optical scanning device according to claim 1, wherein the bridge has a shape that straddles the frame.

7. The optical scanning device according to claim 1, wherein the connecting portion has a light shielding wall formed on a bridge side of the second mounting base.

8. The optical scanning device according to claim 1, wherein a light shielding plate is provided on the second mounting base.

9. The optical scanning device according to claim 1, wherein the connecting portion comprises a dummy portion corresponding to the second reflecting portion.

10. The optical scanning device according to claim 9, wherein a dummy tip portion is provided at a tip of the dummy portion and a mirror plate is mounted on either a front surface or a rear surface of the dummy tip portion.

11. The optical scanning device according to claim 1, wherein the connecting portion is configured to be asymmetric with respect to a plane which passes through a center of the first reflecting portion and is perpendicular to the first reflecting portion.

12. The optical scanning device according to claim 1, wherein the frame has an open ring shape or a closed ring shape.

13. The optical scanning device according to claim 1, comprising a swinging unit configured to swing the coupling portion.

14. The optical scanning device according to claim 13, wherein the swinging unit is a piezoelectric element provided on the frame or a magnetic body configured to oscillate by alternating current magnetic fields.

15. The optical scanning device according to claim 1, wherein a reinforcing rib is provided on the bridge.

16. The optical scanning device according to claim 1, wherein an angle formed between the first reflecting portion and the second reflecting portion is 180 degrees or less.

17. The optical scanning device according to claim 1, wherein the frame has a ring shape with one open side, and the first reflecting portion and the second reflecting portion are connected by the bridge extending along the open side of the frame.

18. An optical scanning device, comprising:
   a fixed portion having a ring shape;
   a first reflecting portion which is positioned inside the ring shape of the fixed portion and is supported at two points thereof by hinge portions such that the first reflecting portion swings with respect to the fixed portion; and
a second reflecting portion smaller in size than the first reflecting portion, the second reflecting portion being connected to the first reflecting portion positioned inside the ring shape of the fixed portion at a position spaced apart from the first reflecting portion in an axial direction of swinging and being configured to swing synchronously with swinging of the first reflecting portion,
wherein the second reflecting portion is disposed higher than the first reflecting portion.

* * * * *